United States Patent
Song et al.

(10) Patent No.: US 12,505,656 B2
(45) Date of Patent: Dec. 23, 2025

(54) FLOATING OBJECT INFORMATION FUSION SYSTEM AND OPERATING METHOD THEREOF

(71) Applicant: SHIP AND OCEAN INDUSTRIES R&D CENTER, New Taipei (TW)

(72) Inventors: Yan-Sheng Song, Kaohsiung (TW); Yu-Ting Peng, Kaohsiung (TW); Chien-Hung Liu, Kaohsiung (TW)

(73) Assignee: SHIP AND OCEAN INDUSTRIES R&D CENTER, New Taipei (TW)

( * ) Notice: Subject to any disclaimer, the term of this patent is extended or adjusted under 35 U.S.C. 154(b) by 64 days.

(21) Appl. No.: 18/395,605

(22) Filed: Dec. 24, 2023

(65) Prior Publication Data

US 2025/0209801 A1    Jun. 26, 2025

(51) Int. Cl.
*B63B 79/10* (2020.01)
*G06V 10/80* (2022.01)

(52) U.S. Cl.
CPC ............ *G06V 10/803* (2022.01); *B63B 79/10* (2020.01)

(58) Field of Classification Search
CPC .............................. G06V 10/803; B63B 79/10
USPC ....................................................... 348/148
See application file for complete search history.

(56) References Cited

U.S. PATENT DOCUMENTS

2016/0266246 A1* 9/2016 Hjelmstad ............... G01S 15/86
2023/0161050 A1    5/2023 Salzman et al.

FOREIGN PATENT DOCUMENTS

| CN | 115166742 A | 10/2022 |
| CN | 116437242 A | 7/2023 |
| CN | 117274847 A | 12/2023 |
| TW | 202035947 A | 10/2020 |
| WO | 2023/167071 A1 | 9/2023 |

* cited by examiner

*Primary Examiner* — Jeffery A Williams
(74) *Attorney, Agent, or Firm* — Cheng-Ju Chiang (57) ABSTRACT

The present invention discloses a floating object information fusion system and operating method thereof. The floating object information fusion system comprises a processing module, at least one image capture device, at least one AIS data collecting device and at least one radiolocation device. The operating method of the present invention allows the floating object information fusion system generates at least one predictive floating object identification data loop, at least one predictive floating object visual data loop and the at least one predictive floating object location data loop, therefore to perform data fusion and create a final data fusion loop.

15 Claims, 5 Drawing Sheets

FLOATING OBJECT INFORMATION FUSION SYSTEM AND OPERATING METHOD THEREOF

TECHNICAL FIELD

The present invention relates to a floating object information fusion system and operating method thereof. The floating object information specifically means the data related to ship, boat or the other water surface vehicles which may be acquire or collected by certain sensor or receiver.

BACKGROUND OF RELATED ARTS

The object recognition plays an important role in the artificial intelligence technology. However, the object recognition used in specific technical field may face several problems.

For instance, in the marine autopilot technical field, the autopilot system or the pilot assistance system has to recognize the floating object appears on the surface of water. Furthermore, the abovementioned systems also require the information which are collected via different kinds of sensors while the systems determining what the floating object is and informing the pilot or system user.

However, numerous problems occur when the information collected by different kinds of sensors. Therefore, an efficient and accurate system and method for processing the data fusion of the aforementioned information collected by different kinds of sensors, especially for collecting the floating object on surface of water becomes a complicated problem which needs to be solved.

SUMMARY

In order to solve the problem of the prior art, the purpose of the present invention is to provide a floating object information fusion system and operating method thereof.

The floating object information fusion system disclosed in the present invention comprises a processing module, at least one image capture device, at least one AIS data collecting device and at least one radiolocation device.

The at least one image capture device is connected with the processing module, and the at least one image capture device capturing at least one floating object visual data. The at least one AIS data collecting device is connected with the processing module, and the at least one AIS data collecting device collecting at least one floating object identification data.

The at least one radiolocation device is connected with the processing module, and the at least one radiolocation device detects at least one floating object location data. In the disclosed invention, the processing module receives the at least one floating object identification data, the at least one floating object visual data and the at least one floating object location data for executing data fusion.

The abovementioned data fusion comprises the steps as follows. The steps also performed by the operating method of the floating object information fusion system.

In step (A), the abovementioned floating object information fusion system is provided. Thereinafter, the step (B) is that the processing module analyzes the at least one floating object identification data, the at least one floating object visual data and the at least one floating object location data.

Furthermore, step (C) shows that the processing module establishes at least one floating object identification tracking data loop, at least one floating object visual tracking data loop and at least one floating object location tracking data loop from the at least one floating object identification data, the at least one floating object visual data and the at least one floating object location data respectively. Thereon, the processing module filters latest time series of the at least one floating object identification tracking data loop, the at least one floating object visual tracking data loop and the at least one floating object location tracking data loop in the step (D).

Step (E) is that the processing module discards the at least one floating object identification tracking data loop, the at least one floating object visual tracking data loop and the at least one floating object location tracking data loop which are no longer updated in an updating period, and the processing module further generates at least one predictive floating object identification data loop, at least one predictive floating object visual data loop and at least one predictive floating object location data loop via the at least one floating object identification tracking data loop, the at least one floating object visual tracking data loop and the at least one floating object location tracking data loop respectively in the next step (F).

In step (G), the processing module selects any two of the at least one predictive floating object identification data loop, the at least one predictive floating object visual data loop and the at least one predictive floating object location data loop for a first data fusion, generating a first data fusion loop.

At last, the step (H) performs that the processing module selects the at least one predictive floating object identification data loop, the at least one predictive floating object visual data loop or the at least one predictive floating object location data loop which is not selected in the first data fusion and executing a final data fusion with the first data fusion loop, creating a final data fusion loop.

Embodiments of the invention are illustrated by way of example, and not by way of limitation, in the figures of the accompanying drawings in which like reference numerals refer to similar elements.

DETAILED DESCRIPTION OF THE INVENTION

In order to understand the technical features and practical efficacy of the present invention and to implement it in accordance with the contents of the specification, hereinafter, preferred embodiments of the present invention will be described in detail with reference to the accompanying drawings.

The "connection" mentioned in this embodiment does not actually have absolute limitation in space and location. Specifically, the term of "connection" should reasonably be understood as any physical connection that can realize the function. The physical connection includes mechanical connection, electrical connection, wired connection or wireless connection, and the invention is not limited to these.

Figure 1:
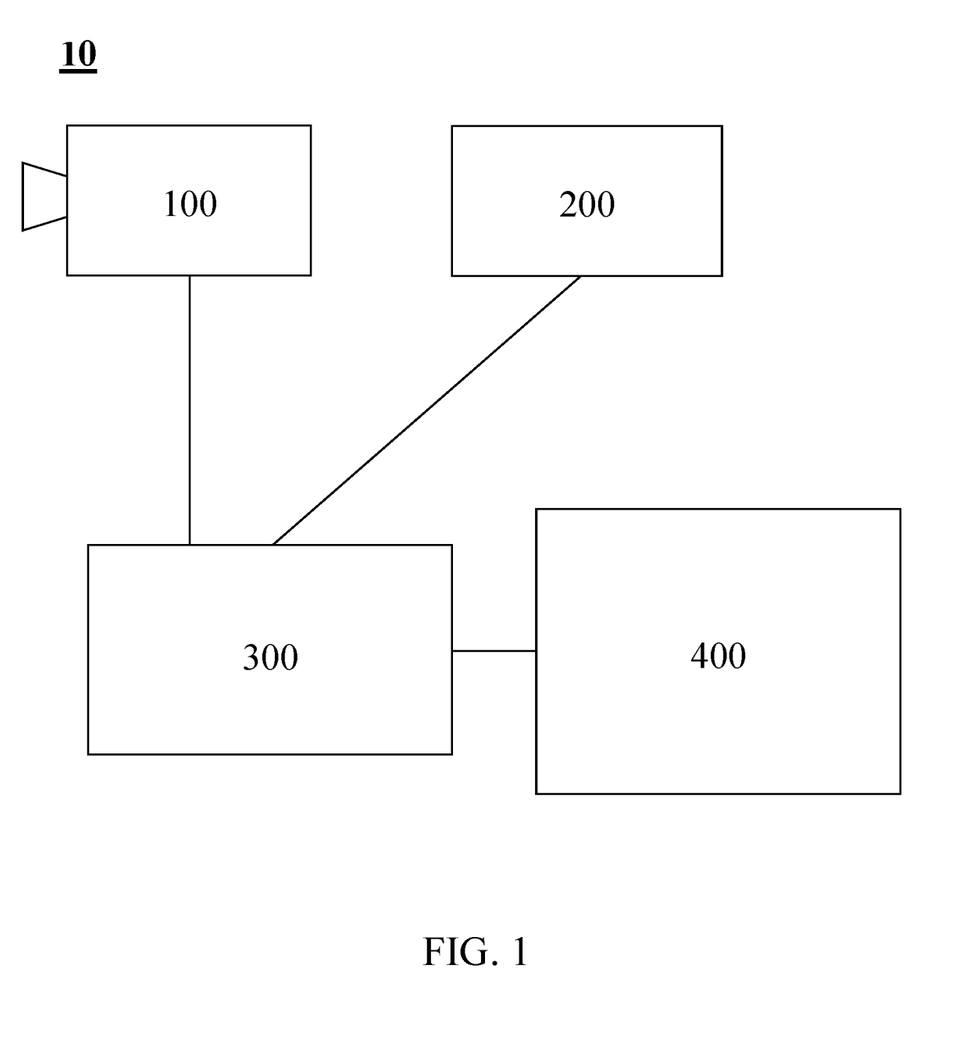
FIG. 1 illustrates the hardware schematic diagram of embodiment of the floating object information fusion system in present invention.

Please refer to FIG. 1. FIG. 1 illustrates the hardware schematic diagram of embodiment of the floating object information fusion system in present invention.

The floating object information fusion system 100 illustrated in this embodiment comprises a processing module 300, at least one image capture device 100, at least one AIS data collecting device 200 and at least one radiolocation device 400. In current embodiment, the number of the image capture device 100, AIS data collecting device 200 and radiolocation device 400 are not limited thereto.

Specifically, the processing module 300 includes a central processing unit, or further comprises a graphics processing unit. Therefore, this hardware condition makes the processing module 300 be able to process the analog or digital signals which are acquired by different kinds of sensors such as the image capture device 100, AIS data collecting device 200 and radiolocation device 400.

Furthermore, the image capture device 100 of the present embodiment is camera which detects visible light, invisible light or combination thereof. The image capture device 100 of this embodiment is connected with the processing module 300, and the image capture device 100 captures at least one floating object visual data.

On the other hand, the AIS data collecting device 200 is connected with the processing module 300, and the AIS data collecting device 200 collects at least one floating object identification data.

The radiolocation device 400 is connected with the processing module 300, and the radiolocation device 400 detects at least one floating object location data. Specifically, the radiolocation device 400 in present embodiment is radar.

In this embodiment, the processing module 300 receives the at least one floating object identification data, the at least one floating object visual data and the at least one floating object location data for executing data fusion.

Figure 2:
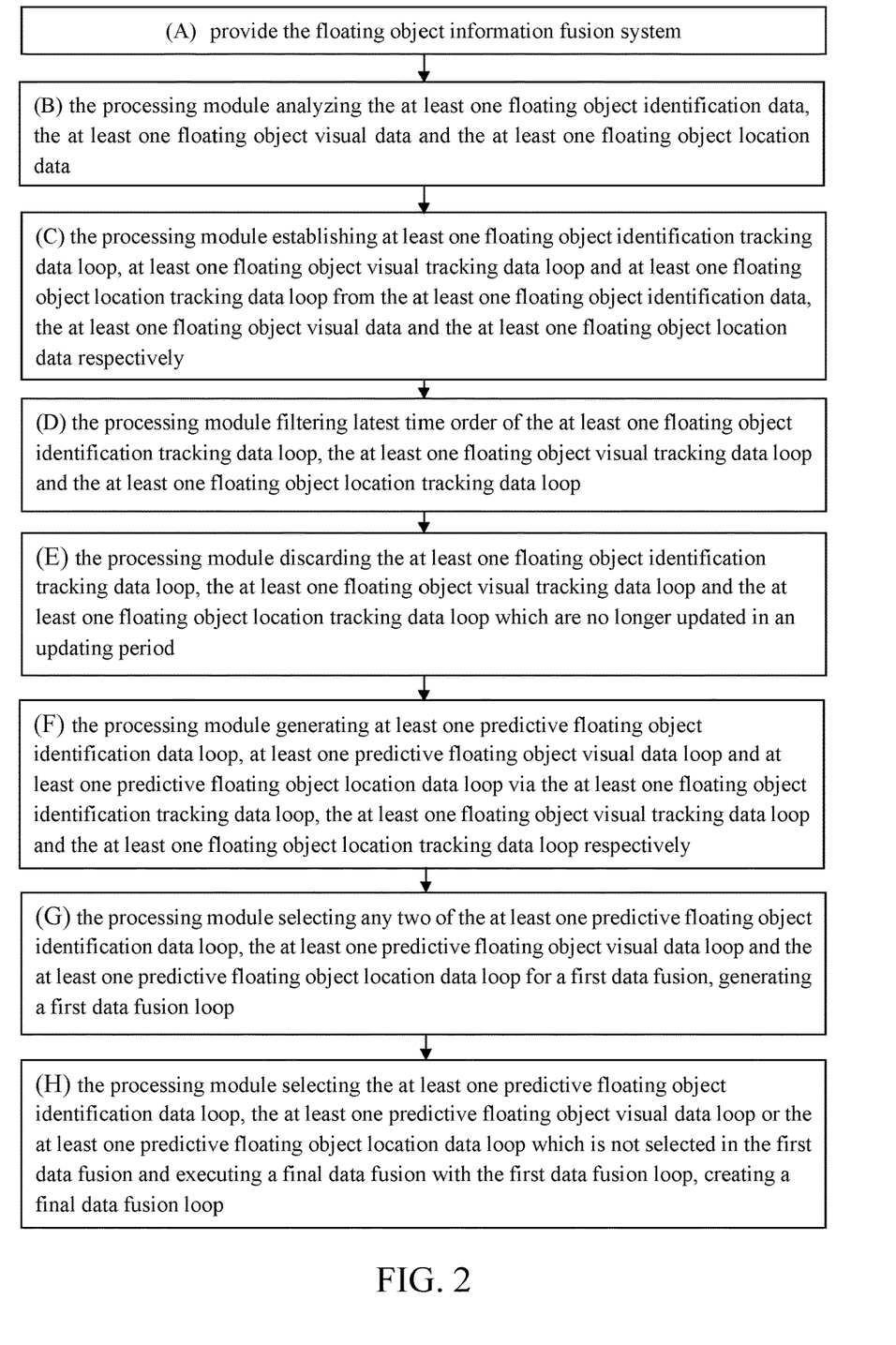
FIG. 2 illustrates the flow chart of the embodiment of the operating method of the floating object information fusion system in present invention.

Please refer to FIG. 2. FIG. 2 illustrates the flow chart of the embodiment of the operating method of the floating object information fusion system in present invention.

Figure 3:
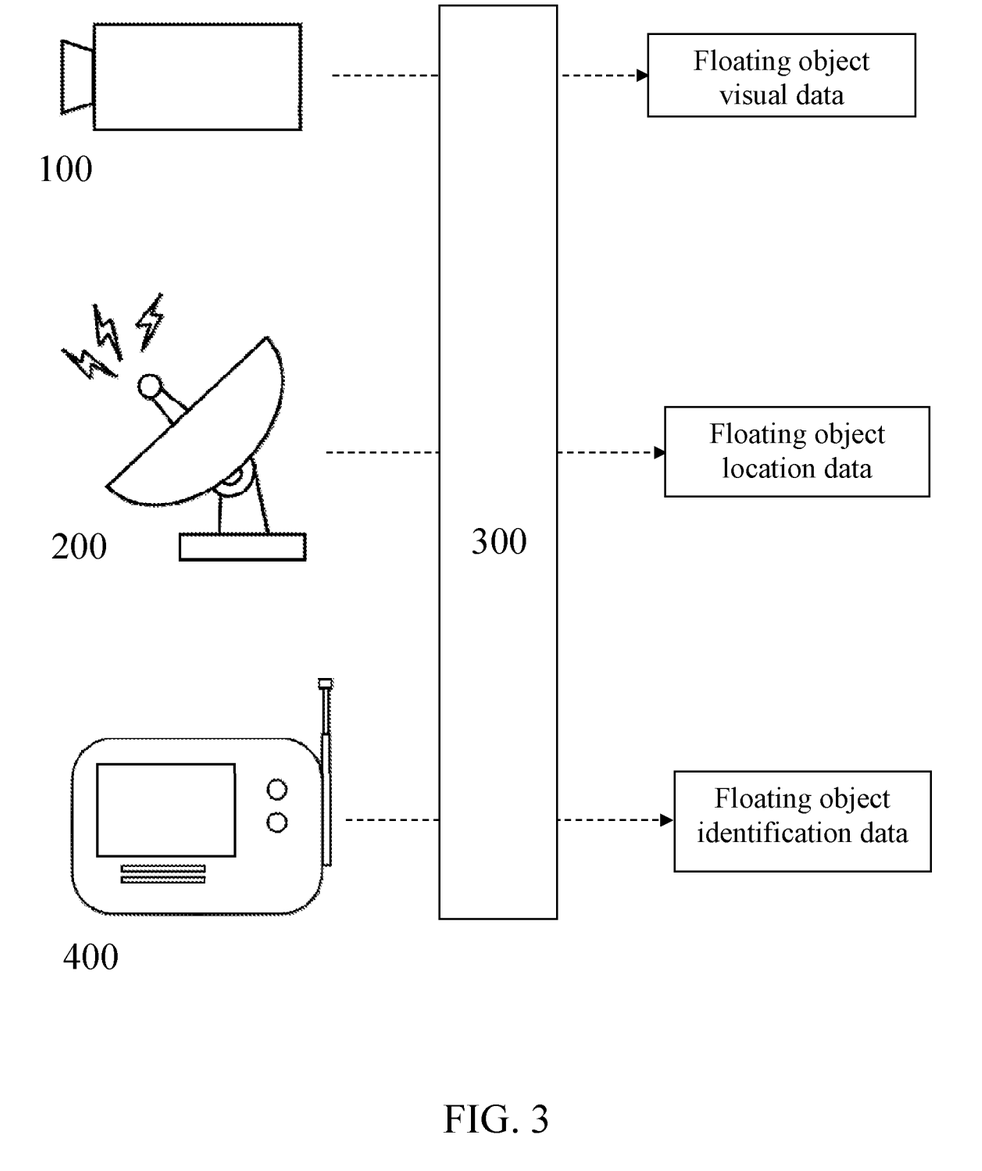
FIG. 3 illustrates the data collecting schematic diagram of embodiment of the floating object information fusion system in present invention.

In step (A), the abovementioned floating object information fusion system 100 is provided. Furthermore, please refer to FIG. 3. FIG. 3 illustrates the data collecting schematic diagram of embodiment of the floating object information fusion system in present invention.

As shown in FIG. 3, the step (B) is that the processing module 300 analyzes the at least one floating object identification data, the at least one floating object visual data and the at least one floating object location data in the present embodiment.

In this embodiment, the signal of the at least one floating object identification data is collected by the AIS data collecting device 200. The AIS data collecting device 200 receives the AIS signal which is sent by floating object such as ship and boat on water. Hence, the at least one floating object identification data mentioned herein comprises GPS coordinates, MMSI number, ship speed, heading, ship name and ship type.

The at least one floating object visual data is collected by the image capture device 100, and the floating object visual data of the present embodiment comprises ship image coordinates, GPS coordinates, image area ratio and ship type.

The at least one floating object location data is collected by the radiolocation device 400, and the at least one floating object location data in the present embodiment comprises GPS coordinates, ship speed, heading, Time to Closest Point of Approach (TCPA) and Distance to Closest Point of Approach (DCPA).

After the analysis executed by the processing module 300, the floating object identification data, floating object visual data and floating object location data in the present embodiment will be distributed to the correct data loop. In other words, every floating object shall have the data loop per se, therefore to monitor and recognize the situation and movement on water.

In step (C), the processing module 300 establishes at least one floating object identification tracking data loop, at least one floating object visual tracking data loop and at least one floating object location tracking data loop from the at least one floating object identification data, the at least one floating object visual data and the at least one floating object location data respectively.

Figure 4:
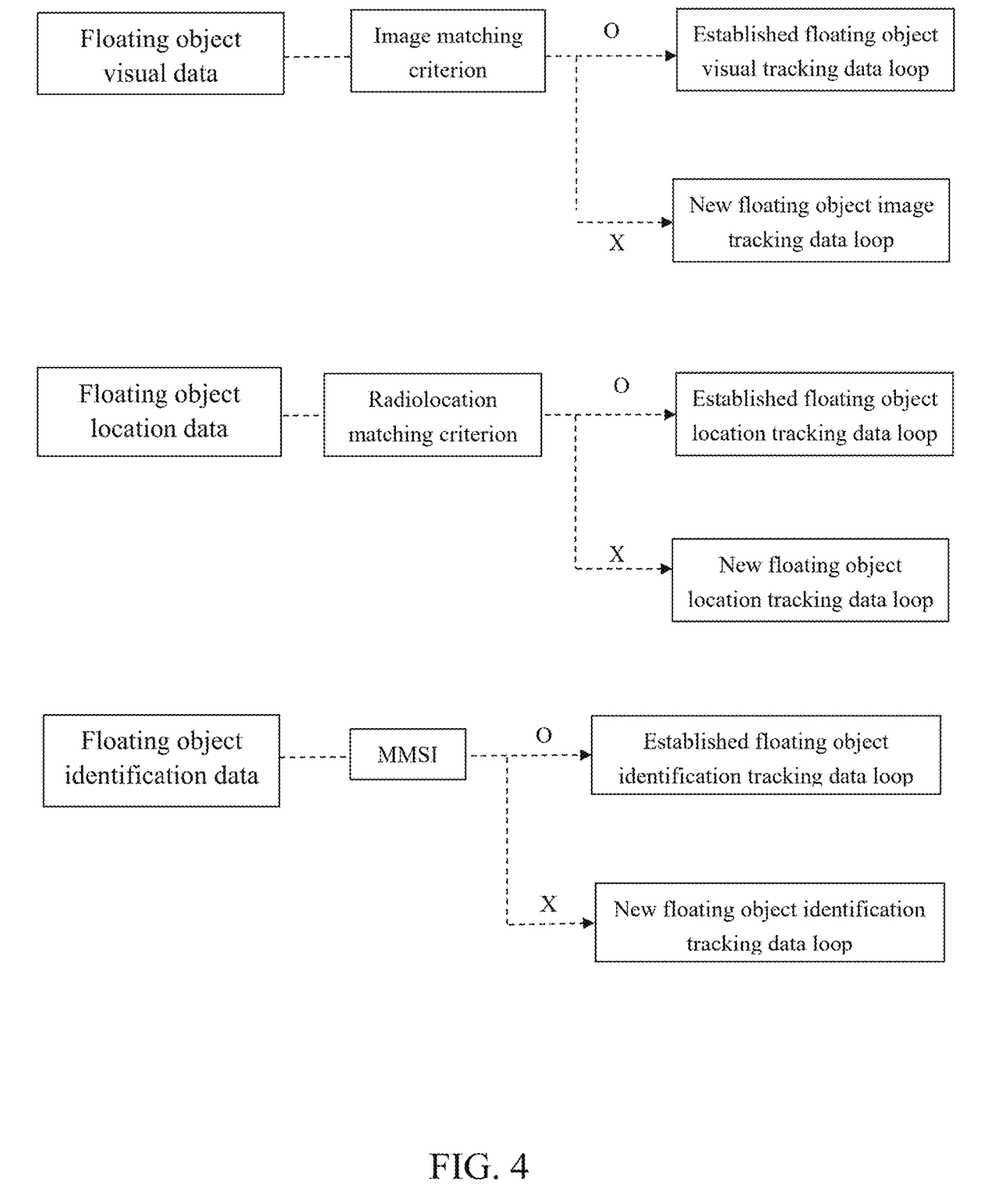
FIG. 4 illustrates the data loop generating schematic diagram of embodiment of the floating object information fusion system in present invention.

Please refer to FIG. 4. FIG. 4 illustrates the data loop generating schematic diagram of embodiment of the floating object information fusion system in present invention.

FIG. 4 clearly illustrates how to create different kinds of data loop for the floating object or the new entered floating object on water surface. That is, the at least one floating object identification data is distributed to at least one established floating object identification tracking data loop while the at least one floating object identification data and the at least one established floating object identification tracking data loop comprising the same MMSI number.

In this embodiment, if the MMSI number of the at least one floating object identification data fails to be matched with the at least one established floating object identification tracking data loop, at least one new floating object identification tracking data loop is created and the at least one floating object identification data is distributed to the at least one new floating object identification tracking data loop in the step (C).

Once a new floating object identification tracking data loop has been created in the present embodiment, that means new floating object(s) invade(s) the detectable area of the AIS data collecting device 200.

The at least one floating object visual data is calculated under an image matching criterion in this embodiment. In fact, the image matching criterion is defined by the user of floating object information fusion system 100. For instance, the color, shape or the other conditions of the image may be used for defining the image matching criterion (e.g., a larger ship may perform larger image area ratio).

The image matching criterion mentioned in current embodiment is to identify whether the floating object is the same or not. Therefore, if the at least one floating object visual data is matched with the image matching criterion, and the at least one floating object visual data is distributed to at least one established floating object image tracking data loop. If the at least one floating object visual data fails to be matched with the image matching criterion, at least one new floating object visual tracking data loop is created via the at least one floating object visual data, meaning a new floating object appears in the field of image capture device 100 in step (C).

The same mechanism is performed in the at least one floating object location data. The at least one floating object location data of this embodiment is calculated under a radiolocation matching criterion. The radiolocation matching criterion of the present embodiment is also defined by the user, too.

If the at least one floating object location data is matched with the radiolocation matching criterion, and the at least one floating object location data is distributed to at least one established floating object location tracking data loop. However, if the at least one floating object location data fails to be matched with the radiolocation matching criterion, at least one new floating object location tracking data loop is created via the at least one floating object location data in step (C).

Figure 5:
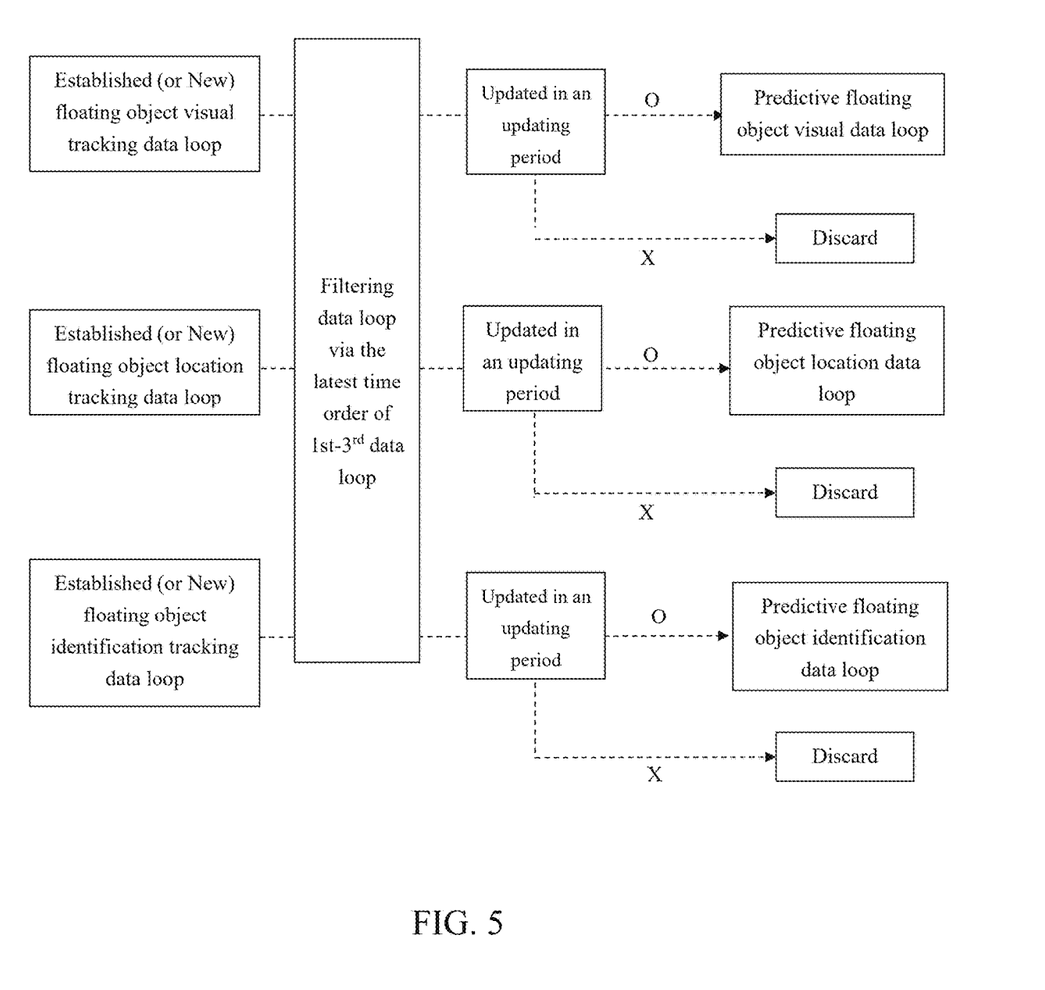
FIG. 5 illustrates the predictive data loop generating schematic diagram of embodiment of the floating object information fusion system in present invention.

Thereinafter, please refer to FIG. 5. FIG. 5 illustrates the predictive data loop generating schematic diagram of embodiment of the floating object information fusion system in present invention. As illustrated in FIG. 5, the processing module 300 of the present embodiment filters latest time series of the at least one floating object identification tracking data loop, the at least one floating object visual tracking data loop and the at least one floating object location tracking data loop in the step (D).

Specifically, the at least one floating object identification tracking data loop, the at least one floating object visual tracking data loop and the at least one floating object location tracking data loop of the present embodiment keep updating while the floating object(s) being continuously detected by the image capture device 100, AIS data collecting device 200 or radiolocation device 400 until the detected floating object leaves the detectable area of the image capture device 100, AIS data collecting device 200 or radiolocation device 400.

Therefore, when the at least one floating object identification tracking data loop, the at least one floating object visual tracking data loop and the at least one floating object location tracking data loop keep being generated and updated according to time series, the latest $1^{st}$ data loop to $3^{rd}$ data loop of the at least one floating object identification tracking data loop, the at least one floating object visual tracking data loop and the at least one floating object location tracking data loop will be filtered for the following procedure.

In the proposed embodiment of the present invention, the latest $1^{st}$ data loop of the at least one floating object identification tracking data loop, the at least one floating object visual tracking data loop and the at least one floating object location tracking data loop are also capable for the following procedure if the hardware condition satisfies the high-speed calculation of prediction work.

As illustrated in FIG. 5, step (E) is that the processing module 300 discards the at least one floating object identification tracking data loop, the at least one floating object visual tracking data loop and the at least one floating object location tracking data loop which are no longer updated in an updating period, and the processing module 300 further generates at least one predictive floating object identification data loop, at least one predictive floating object visual data loop and at least one predictive floating object location data loop via the at least one floating object identification tracking data loop, the at least one floating object visual tracking data loop and the at least one floating object location tracking data loop respectively in the next step (F).

In other words, the tracking data loop no longer being updated in the updating period mentioned in the step (E) means that the floating object has left the detectable area of the image capture device 100, AIS data collecting device 200 or radiolocation device 400. Therefore, the floating object has no necessity to be tracked, and the tracking data loop of the left floating object is discarded.

In present embodiment, the latest $1^{st}$ data loop of the at least one floating object identification tracking data loop, the at least one floating object visual tracking data loop and the at least one floating object location tracking data loop are keeping updating and generating the at least one predictive floating object identification data loop, at least one predictive floating object visual data loop and at least one predictive floating object location data loop.

Hence, step (G) is that the processing module 300 selects any two of the at least one predictive floating object identification data loop, the at least one predictive floating object visual data loop and the at least one predictive floating object location data loop for a first data fusion, generating a first data fusion loop.

The first data fusion loop is generated under certain conditions. The processing module 300 matches the selected any two of the at least one predictive floating object identification data loop, the at least one predictive floating object visual data loop and the at least one predictive floating object location data loop via a minimum fusion threshold. The minimum fusion threshold is used to determine whether any two of the predictive data loops can be fused or not. In other words, if the predictive data loops are generated via different floating objects, one of the predictive data loops will be over the minimum fusion threshold.

For example, if the angle between the heading of the predictive floating object location data loop and the heading of the predictive floating object identification data loop is over 15 degrees (minimum fusion threshold set by user), then the predictive floating object location data loop and the predictive floating object identification data loop in this example will be regarded as failing fusion data loop. However, if the angle between the heading of the predictive floating object location data loop and the heading of the predictive floating object identification data loop is NOT over 15 degrees, the predictive floating object location data loop and the predictive floating object identification data loop may be successful for generating a first data fusion loop.

The minimum fusion threshold mentioned in the present embodiment comprises multiple conditions which may be determined by user, such as the GPS coordinates, ship speed, heading or the other data of the detected floating objects. The present invention is not limited thereto.

At last, the step (H) performs that the processing module selects the at least one predictive floating object identification data loop, the at least one predictive floating object visual data loop or the at least one predictive floating object location data loop which is not selected in the first data fusion and executing a final data fusion with the first data fusion loop, creating a final data fusion loop.

In step (H) the minimum fusion threshold will be used again. However, the requirement of the minimum fusion threshold will be changed to the non-selected predictive data loop. For instance, if the predictive floating object visual data loop is not selected in step (G), in the following step (H), the minimum fusion threshold may be used for comparing the GPS coordinates of the first data fusion with the ship image coordinates and GPS coordinates of the predictive floating object visual data loop. The present invention is not limited thereto.

Embodiments of the invention are illustrated by way of example, and not by way of limitation, in the figures of the accompanying drawings in which like reference numerals refer to similar elements.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. While the preferred embodiment of the invention has been illustrated and described, it will be appreciated that various changes can be made therein without departing from the spirit and scope of the invention.

What is claimed is:

1. A floating object information fusion system, comprising:
    a processing module;
    at least one image capture device, connected with the processing module, and the at least one image capture device capturing at least one floating object visual data;
    at least one Automatic Identification System (AIS) data collecting device, connected with the processing module, and the at least one Automatic Identification System (AIS) data collecting device collecting at least one floating object identification data;
    at least one radiolocation device, connected with the processing module, and the at least one radiolocation device detects at least one floating object location data;
    wherein the processing module receives the at least one floating object identification data, the at least one floating object visual data and the at least one floating object location data for executing data fusion;
    wherein the data fusion comprises:
        analyzing the at least one floating object identification data, the at least one floating object visual data and the at least one floating object location data;
        establishing at least one floating object identification tracking data loop, at least one floating object visual tracking data loop and at least one floating object location tracking data loop from the at least one floating object identification data, the at least one floating object visual data and the at least one floating object location data respectively;
        filtering latest time series of the at least one floating object identification tracking data loop, the at least one floating object visual tracking data loop and the at least one floating object location tracking data loop;
        discarding the at least one floating object identification tracking data loop, the at least one floating object visual tracking data loop and the at least one floating object location tracking data loop which are no longer updated in an updating period threshold;
        generating at least one predictive floating object identification data loop, at least one predictive floating object visual data loop and at least one predictive floating object location data loop via the at least one floating object identification tracking data loop, the at least one floating object visual tracking data loop and the at least one floating object location tracking data loop respectively;
        selecting any two of the at least one predictive floating object identification data loop, the at least one predictive floating object visual data loop and the at least one predictive floating object location data loop for a first data fusion, generating a first data fusion loop; and
        selecting the at least one predictive floating object identification data loop, the at least one predictive floating object visual data loop or the at least one predictive floating object location data loop which is not selected in the first data fusion and executing a final data fusion with the first data fusion loop, creating a final data fusion loop;
    wherein the at least one floating object identification tracking data loop, the at least one floating object visual tracking data loop and the at least one floating object location tracking data loop keep being generated and updated according to time series.

2. The floating object information fusion system as claimed in claim 1, wherein the processing module includes a central processing unit.

3. The floating object information fusion system as claimed in claim 1, wherein the processing module further comprises a graphics processing unit.

4. The floating object information fusion system as claimed in claim 1, wherein the at least one image capture device is a camera.

5. The floating object information fusion system as claimed in claim 4, wherein the camera detects visible light, invisible light or combination thereof.

6. The floating object information fusion system as claimed in claim 1, wherein the at least one radiolocation device is radar.

7. An operating method of a floating object information fusion system, comprising:
    (A) providing the floating object information fusion system as claimed in claim 1;
    (B) the processing module analyzing the at least one floating object identification data, the at least one floating object visual data and the at least one floating object location data;
    (C) the processing module establishing at least one floating object identification tracking data loop, at least one floating object visual tracking data loop and at least one floating object location tracking data loop from the at least one floating object identification data, the at least one floating object visual data and the at least one floating object location data respectively;
    (D) the processing module filtering latest time series of the at least one floating object identification tracking data loop, the at least one floating object visual tracking data loop and the at least one floating object location tracking data loop;
    (E) the processing module discarding the at least one floating object identification tracking data loop, the at least one floating object visual tracking data loop and the at least one floating object location tracking data loop which are no longer updated in an updating period;
    (F) the processing module generating at least one predictive floating object identification data loop, at least one predictive floating object visual data loop and at least one predictive floating object location data loop via the at least one floating object identification tracking data loop, the at least one floating object visual tracking data loop and the at least one floating object location tracking data loop respectively;
    (G) the processing module selecting any two of the at least one predictive floating object identification data loop, the at least one predictive floating object visual data loop and the at least one predictive floating object location data loop for a first data fusion, generating a first data fusion loop; and (H) the processing module selecting the at least one predictive floating object identification data loop, the at least one predictive floating object visual data loop or the at least one predictive floating object location data loop which is not selected in the first data fusion and executing a final data fusion with the first data fusion loop, creating a final data fusion loop;

wherein the at least one floating object identification tracking data loop, the at least one floating object visual tracking data loop and the at least one floating object location tracking data loop keep being generated and updated according to time series.

8. The operating method of a floating object information fusion system as claimed in claim 7, wherein the analyzing of the at least one floating object identification data comprises GPS coordinates, MMSI number, ship speed, heading, ship name and ship type.

9. The operating method of a floating object information fusion system as claimed in claim 8, wherein the at least one floating object identification data is distributed to at least one established floating object identification tracking data loop while the at least one floating object identification data and the at least one established floating object identification tracking data loop comprising same MMSI number; if the MMSI number of the at least one floating object identification data fails to be matched with the at least one established floating object identification tracking data loop, at least one new floating object identification tracking data loop is created and the at least one floating object identification data is distributed to the at least one new floating object identification tracking data loop in the step (C).

10. The operating method of a floating object information fusion system as claimed in claim 7, wherein the analyzing of the at least one floating object visual data comprises ship image coordinates, GPS coordinates, image area ratio and ship type.

11. The operating method of a floating object information fusion system as claimed in claim 10, wherein the at least one floating object visual data is calculated under an image matching criterion; if the at least one floating object visual data is matched with the image matching criterion, and the at least one floating object visual data is distributed to at least one established floating object visual tracking data loop;

and if the at least one floating object visual data fails to be matched with the image matching criterion, at least one new floating object visual tracking data loop is created via the at least one floating object visual data in step (C).

12. The operating method of a floating object information fusion system as claimed in claim 7, wherein the analyzing of the at least one floating object location data comprises GPS coordinates, ship speed, heading, Time to Closest Point of Approach (TCPA) and Distance to Closest Point of Approach (DCPA).

13. The operating method of a floating object information fusion system as claimed in claim 12, wherein the at least one floating object location data is calculated under a radiolocation matching criterion; if the at least one floating object location data is matched with the radiolocation matching criterion, and the at least one floating object location data is distributed to at least one established floating object location tracking data loop; and if the at least one floating object location data fails to be matched with the radiolocation matching criterion, at least one new floating object location tracking data loop is created via the at least one floating object location data in step (C).

14. The operating method of a floating object information fusion system as claimed in claim 7, wherein the latest time series of the at least one floating object identification tracking data loop, the at least one floating object visual tracking data loop and the at least one floating object location tracking data loop range from latest $1^{st}$ data loop to $3^{rd}$ data loop.

15. The operating method of a floating object information fusion system as claimed in claim 14, wherein the latest time series of the at least one floating object identification tracking data loop, the at least one floating object visual tracking data loop and the at least one floating object location tracking data loop is the latest $1^{st}$ data loop.

* * * * *